(12) United States Patent
Kabuto

(10) Patent No.: US 9,253,535 B2
(45) Date of Patent: Feb. 2, 2016

(54) SINK DEVICE RECEIVING AN IMAGE SIGNAL FROM A SOURCE DEVICE AND POWER SUPPLY METHOD FOR SAME

(75) Inventor: Nobuaki Kabuto, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/363,819

(22) PCT Filed: Dec. 16, 2011

(86) PCT No.: PCT/JP2011/007031
§ 371 (c)(1),
(2), (4) Date: Jun. 9, 2014

(87) PCT Pub. No.: WO2013/088480
PCT Pub. Date: Jun. 20, 2013

(65) Prior Publication Data
US 2014/0327833 A1    Nov. 6, 2014

(51) Int. Cl.
G06F 3/00 (2006.01)
H04N 21/443 (2011.01)
G06F 1/26 (2006.01)
H04N 5/63 (2006.01)
H04N 21/442 (2011.01)
G06F 1/32 (2006.01)
H04N 21/4363 (2011.01)
G09G 5/00 (2006.01)

(52) U.S. Cl.
CPC ............ *H04N 21/4432* (2013.01); *G06F 1/266* (2013.01); *G06F 1/3265* (2013.01); *G09G 5/006* (2013.01); *H04N 5/63* (2013.01); *H04N 21/43635* (2013.01); *H04N 21/4436* (2013.01); *H04N 21/44231* (2013.01); *G09G 2330/021* (2013.01); *G09G 2370/045* (2013.01); *G09G 2370/06* (2013.01); *G09G 2370/12* (2013.01); *G09G 2370/18* (2013.01); *G09G 2370/22* (2013.01); *Y02B 60/1242* (2013.01)

(58) Field of Classification Search
None
See application file for complete search history.

(56) References Cited

U.S. PATENT DOCUMENTS

| | | | |
|---|---|---|---|
| 2007/0028281 A1* | 2/2007 | Frederick et al. | 725/130 |
| 2009/0167946 A1* | 7/2009 | Samada et al. | 348/558 |
| 2010/0132001 A1 | 5/2010 | Kitano et al. | |
| 2010/0135429 A1 | 6/2010 | Nakajima | |

FOREIGN PATENT DOCUMENTS

| | | |
|---|---|---|
| JP | 2007-316717 A | 12/2007 |
| JP | 2009-44706 A | 2/2009 |
| JP | 2009-177269 A | 8/2009 |
| JP | 2010-4510 A | 1/2010 |
| JP | 2010-117789 A | 5/2010 |

* cited by examiner

*Primary Examiner* — David E Martinez
(74) *Attorney, Agent, or Firm* — Baker Botts L.L.P.

(57) ABSTRACT

In a system in which an image signal is transmitted from a source device to a sink device and the sink device (or source device) supplies power to the source device (or sink device), power saving of standby power supplied by the sink device (or source device) is realized.

There is a feature that a sink device or a source device detects connection with the other device, starts the supply of standby power, confirms that the standby power does not flow or confirms that message exchange with the other device is possible even if the standby power is temporarily stopped, and stops the supply of the standby power.

8 Claims, 9 Drawing Sheets

FIG. 6

| Start Bit | CEC Header Block | CEC Opcode Block | Initiator Physical Address | CDC Opcode | CDC Parameter |

FIG. 7

| CDC Opcode | Parameters | Parameter description | Response |
|---|---|---|---|
| <CDC_Power_Request> | [Port] [Error] [Power] | Requesting voltage and current. | <CDC_Power_Status> |
| <CDC_Power_Status> | [Port] [Error] [Power] | Supplying voltage and current. | - |
| <CDC_Power_Notice> | [Port] [Error] [Power] | Will change to this voltage and current. | <CDC_Power_Request> |

FIG. 8

| Name | Range | Description | Length | Purpose | | |
|---|---|---|---|---|---|---|
| [Port] | | Port Number | 4 bits | Specify a port number of a initiator device. "0" indicates a output port of the device. "1"-"15"" indicates a input port of the device. | | |
| [Error] | 0 | "No Error" | 4 bits | No error and acept the request. | Always set 0 with <CDC_Power_Request> or <CDC_Power_Notice>. | |
| | 1 | "Parameter error" | | A parameter is not proper.. | | |
| | 2 | "Tentatively, No Capability" | | Not available tentatively though it have the requested feature. | Conditionally set non 0 with <CDC_Power_Status> | |
| | 3 | "No feature" | | No feature. | | |
| | 4-15 | Reserved | | | | |

FIG. 9

| Name | Range Description | | Length | Purpose | |
|---|---|---|---|---|---|
| [Power] | [Voltage] | "5 V" | 1 byte | A voltage and maximum current that a power reception device is allowed to use | |
| | | | 4 bits | A power supplier shall supply 4.8 V to 5.3 V. | |
| | | "3.3V" | | A power supplier shall supply 3.1 V to 3.5 V. | |
| | | "12 V" | | A power supplier shall supply 11.4 V to 12.6 V. | |
| | | "None" | | A power supplier shall supply or draw no more than 0.1 mA within 0 V to 5 V. | |
| | | Reserved 4-15 | | | |
| | [Current] | "None" | 4 bits | A power supplier shall supply no more than 500 mA and draw no more than 0.1 mA. | For DDC+5V pin |
| | | "50 mA" | | A power supplier shall supply at least 55mA, no more than 500 mA. | |
| | | "450 mA" | | A power supplier shall supply at least 455mA, no more than 500 mA. | |
| | | Reserved 3-7 | | | |
| | | "None" | | A power supplier shall supply no more than 540 mA and draw no more than 0.1 mA. | For Utility pin. |
| | | "Cable" | | A power supplier shall supply at least 40mA, no more than 540 mA. | |
| | | "450 mA" | | A power supplier shall supply at least 490mA, no more than 540 mA. | |
| | | "900mA" | | A power supplier shall supply at least 980mA, no more than 1080 mA. | In a 900 mA case, for combination of Utility and HPD pins |
| | | Reserved 12-15 | | | |

SINK DEVICE RECEIVING AN IMAGE SIGNAL FROM A SOURCE DEVICE AND POWER SUPPLY METHOD FOR SAME

TECHNICAL FIELD

The technical field relates to the power supply between an image reception apparatus and an image transmission apparatus.

BACKGROUND ART

PTL 1 discloses "a transmission apparatus including: a signal transmission unit which transmits an image signal to a reception apparatus via a cable, by a differential signal, using multiple channels; an information transmission unit which transmits request information that requests a supply of a power source, to the reception apparatus via the cable; and a power source switching unit which supplies the power source supplied from the reception apparatus via the cable according to transmission of the request information of the information transmission unit, to an internal circuit" (see [0017] of PTL 1).

Moreover, it discloses "when the sink device 120A is connected with the source device 110A via the HDMI cable 130, (c) a +5V power source from the power source circuit 126A of the sink device 120A is supplied to the source device 110A via a reserve line of the HDMI cable 130" ([0192] of PTL 1), "the source device 110A transmits a <Request Power Supply> command that is a power source supply request to the sink device 120A via a CEC line" ([0192] of PTL 1), "when it is possible to supply a requested voltage value and current value, the sink device 120A controls the voltage value and current value of the power source from the power source circuit 126A so as to correspond to the voltage value and current value requested by the source device 110A" ([0196] of PTL 1), "afterward, when the power source via the power source line of the HDMI cable 130 is not necessary in the source device 110A, the source device 110A transmits the <Request Power Supply> command showing that the power source supply is not necessary, to the sink device 120A" ([0198] of PTL 1) and "the state of the power source supply from the sink device 120A to the source device 110A returns to the first state" ([0198] of PTL 1).

PTL 2 discloses "function information is transmitted from the source device to the sink device or from the sink device to the source device as CEC (Consumer Electronics Control) data or CDC (Capability Discovery Channel) data" via a CEC line which is a control line between the source device and the sink device connected by HDMI (HDMI and High-Definition Multimedia Interface are trademarks or registered trademarks of HDMI Licensing, LLC) (see [0160] of PTL 2).

CITATION LIST

Patent Literature

PTL 1: JP 2009-44706 A
PTL 2: JP 2010-4510 A

SUMMARY OF INVENTION

Technical Problem

However, none of the cited references discloses the power saving of standby power supplied by the sink device or the source device.

Solution to Problem

To solve the above-mentioned problem, for example, the configuration described in the claims is adopted.

Although the present application includes multiple means for solving the above-mentioned problem, when one example thereof is given, there is a feature that a sink device that receives an image signal from a source device includes a power supply unit which supplies power to the source device and a detection unit which detects connection with the source device, where the power supply unit starts the power supply after the detection unit detects the connection with the source device.

Advantageous Effects of Invention

According to the above-mentioned means, it is possible to reduce unnecessary standby power and achieve power saving.

BRIEF DESCRIPTION OF DRAWINGS

FIG. 6 is a diagram illustrating one example of the structure of a communication message.
FIG. 7 is a table illustrating one example of the structure of a message in a transmission system.
FIG. 8 is a table illustrating one example of a message in a transmission system.
FIG. 9 is a table illustrating one example of a message in a transmission system.

DESCRIPTION OF EMBODIMENTS

In the following, examples are described.

EXAMPLE 1

Figure 1:
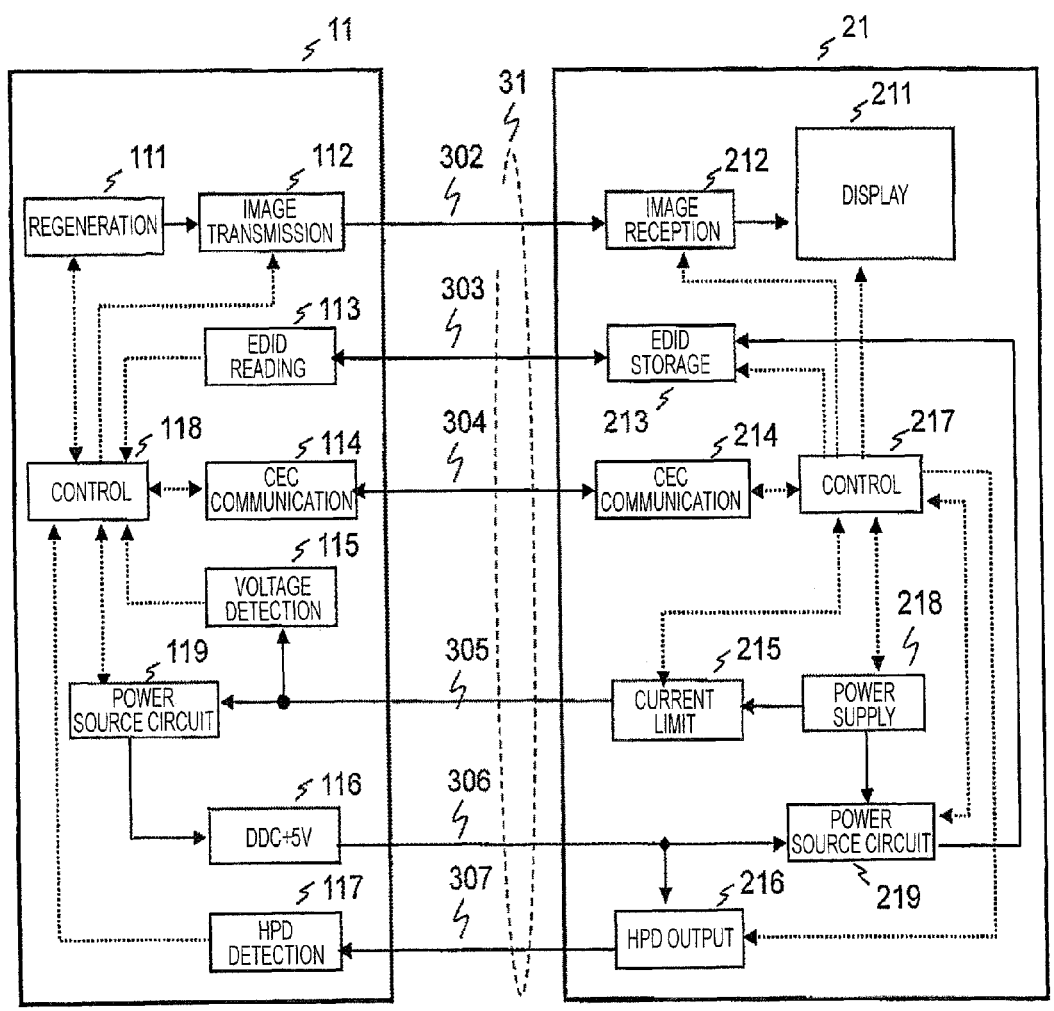
FIG. 1 is a block diagram illustrating one example of a transmission system.

FIG. 1 is a block diagram illustrating one example of a transmission system of the present example, where a source device 11 is connected with a sink device 21 through a cable 31, power is supplied from the sink device 21 to the source device 11 and an image signal is supplied from the source device to the sink device.

For example, the source device 11 is an image signal transmission device such as a disk player, a disc recorder, a semiconductor recorder, a broadcast reception apparatus, a game machine and a PC. It includes a regeneration unit 111, which regenerates an image signal from data acquired from a storage medium such as an optical disc, a magnetic recording disk and a semiconductor memory, broadcasting or a network, an image transmission unit 112, an EDID (Extended Display Identification Data) reading unit 113, a CEC (Consumer Electronics Control) communication unit 114, a voltage detection unit 115, a DDC (Display Data Channel)+5V supply unit 116, an HPD (Hot Plug Detect) detection unit 117, a control unit 118 and a power source circuit 119.

The sink device 21 is, for example, an image signal reception device including a display device such as a liquid crystal display, a plasma display and an organic EL display. The sink device 21 includes a display unit 211, an image reception unit 212, an EDID storage unit 213, a CEC communication unit 214, a current limit unit 215, an HPD output unit 216, a control unit 217, a power supply unit 218 and a power source circuit 219. Here, it may adopt a configuration including a tuner, descrambler, demultiplexer, decoder and recording function that process broadcast waves received by the antenna, and image contents may be possible to be regenerated by the sink device alone.

The cable 31 is a cable that connects between the source device and the sink device, for example, an HDMI cable. It includes an image signal transmission line 302, a DDC line 303 that transmits EDID, a CEC communication line 304, a Utility line 305 that supplies power, a DDC+5V line 306 and an HPD line 307.

Here, the operation of each block in FIG. 1 is described. An image signal regenerated in the regeneration unit 111 of the source device 11 is transmitted from the image transmission unit 112 and received in the image reception unit 212 of the sink device 21 through the image signal transmission line 302 of the cable 31. The received image signal is displayed on the display unit 211 of the sink device 21.

Moreover, the EDID reading unit 113 of the source device 11 reads out sink device's EDID recorded in the EDID storage unit 213 of the sink device 21 through the DDC line 303 of the cable 31.

Moreover, the CEC communication unit 114 of the source device 11 and the CEC communication unit 214 of the sink device 21 transmit and receive a CEC message through the CEC communication line 304 of the cable 31.

Moreover, the power supply unit 218 of the sink device 21 supplies power to the power source circuit unit 119 of the source device through the Utility line 305 of the cable 31. The current limit unit 215 monitors the power supplied from the power supply unit 218 and limits the supplied power if necessary. The voltage detection unit 115 detects the voltage of the power received by the power source circuit 119.

Moreover, the DDC+5V supply unit 116 of the source device supplies a current of 5 V to the HPD output 216 and the power source circuit 219 through the DDC+5V line 306 of the cable 31.

Moreover, the HPD detection unit 117 of the source device detects the current from the HPD output 216 of the sink device through the HPD line 307 of the cable 31.

Next, one example of the structure of a CDC message exchanged by the CEC communication units 114 and 214 is illustrated in FIG. 6. As described in PTL 2, the CDC message is defined as one of CEC messages and formed with "Start Bit" indicting the message head, followed by "CEC Header Block" describing the logical address of a transmission device of the message and the logical address of a reception device of the message, "CEC Opcode Block" indicating the CDC message, "Initiator Physical Address" indicating the physical address of the message transmission device, "CDC Opcode" indicating the type of the CDC message, and "CDC Parameter" indicating the argument of the CDC message.

In the following, although an explanation is given using the CDC message as an example, the present invention is not limited to the CDC message structure, and, if the CDC opcode is defined to the CEC opcode, it is possible to use a CEC message instead of the CDC message. Moreover, bidirectional communication messages such as a DDC used for EDID reading and an HDMI Ethernet (registered mark) channel may be used.

FIG. 7 is a table illustrating one example of the CDC messages. <CDC_Power_Request> denotes a message by which the power reception device requests the power supply device to supply a current shown by argument "Power" to a terminal shown by argument "Port". Argument "Error" is always set to "0" showing "No Error".

<CDC_Power_Status> denotes a message to inform that the power supply device starts supplying the current shown by argument "Power" from the terminal shown by argument "Port". This message is used as a response message to <CDC_Power_Request> or <CDC_Power_Notice>. Argument "Error" shows the response result.

<CDC_Power_Notice> denotes a message to preannounce that the power supply device changes the supply current to a current shown by argument "Power_Sink" from the terminal shown by argument "Port". Argument "Error" is always set to "0" showing "No Error".

In the field of "Response" in FIG. 7, if the destination device corresponds to a function of the present example, response messages responding to respective messages are described.

FIGS. 8 and 9 are tables illustrating one example of arguments of messages. [Port] indicates the power reception terminal or power supply terminal of the message transmission source, and "Port Number" is formed with 4 bits. In "Port Number", "0" indicates an image output terminal, and "1" to "15" indicate image input terminals. "1" to "15" of the image input terminals are common with "Input Port Number" that decides the physical address of a source device described in EDID of each image input terminal, and, if they are combined with "Initiator Physical Address" in the CDC message, it is possible to recognize the physical address of the source device of connection destination. While a 2-byte physical address of connection destination (that is, a physical address described in EDID of the input terminal) may be used instead of the terminal number, expression with 4 bits of "Port Number" is more effective to suppress the message length and shorten the communication time.

[Error] indicates a response result to <CDC_Power_Request> or <CDC_Power_Notice>, and is formed with 4 bits. "0" denotes "No Error", and indicates a state where a requested voltage and current are supplied. "1" indicates a case where there is a contradiction of arguments in a response message, for example, a combination of voltage and current or a combination with "Port Number" indicating a terminal is not proper. "2" indicates that, although a function to supply requested power is provided, it is not possible to perform power supply due to some causes such as set power-off. In a case where a response message including this argument "2" is received, it is possible to make another request in a predetermined time. "3" indicates that a function to supply requested power is not provided. "4" to "15" indicate reserved areas for future extension. Here, even in a case where [Error] is other than "0", it is necessary to write the power supply situation of the terminal indicated by "Port" appropriately with [Power].

[Power] indicates reception or supply power, and is formed with [Voltage] of 4 bits indicating the voltage and [Current] of 4 bits indicating the current. In [Voltage], "0" indicates 5 V, the tolerance is about 5% and the supply voltage range is 4.8 V to 6.3 V. "1" indicates 3.3 V, and the supply voltage range is 3.1 V to 3.5 V. "2" indicates 12 V, and the supply voltage range is 11.4 V to 12.6 V. "3" indicates the case of no supply voltage, and the leakage current is equal to or less than 0.1 mA in a rage from 0 to 5 V. In a case where "3" is set, [Current] should be "0" or "8" indicating that a current reception ability is not given. "4" and subsequence indicate reserved areas for future extension.

In [Current], "0" to "7" indicate current values that can be received by the DDC+5V pin of an image input terminal, and "8" to "15" indicate current values that can be received by the Utility terminal of an image output terminal. In a case where the input terminal or output terminal indicated by [Port] is different, [Error] is set to "1" and [Current] describes the supply current of the terminal indicated by [Port].

[Current] describes "0" in a case where the current received at the time of set power-on by the DDC+5V pin of an image input terminal that receives power is equal to or less than 10 mA, "1" in a case where it is equal to or less than 50 mA, and "2" in a case where it is equal to or less than 450 mA. As for the DDC+5V pin of an image output terminal that supplies power, "0" indicates that power supply is not possible, "1" indicates that a current of 55 mA or more is supplied. "2" indicates that a current of 455 mA or more is supplied, and "3" to "7" indicate reserved areas for future extension. In any settings of "0" to "2", by not supplying a current over 500 mA defined by VESA, it is possible to maintain rear interchangeability with devices in the related art. In a case where a current over 500 mA is supplied, for further consideration of safety, information on the supply of a current over 500 mA may be described in EDID of the sink device in addition to the setting of the above-mentioned CEC message, for double check. Here, it is a result taking into account that a difference of 5 mA between the reception current upper limit and the supply current lower limit is consumed by the cable. Moreover, in a case where the current supply is not given, −0.1 mA is defined for reverse current prevention.

Similarly, [Current] describes "0" or "9" in a case where there is no current received by the Utility pin of an image output terminal that receives power, and "10" in a case where it is equal to or less than 450 mA. In a case where 450 mA is received from both the Utility pin and an HPD terminal, it describes "11". "12" to "15" denote reserved areas for future extension. In any settings of "8" to "11", by not supplying a current over 540 mA, the safety by overcurrent prevention is enhanced. Although this upper limit current is assumed to be 500 mA in the DDC+5V terminal, the upper limit current is increased by a supply increase from 5 mA to 40 mA in the current supply to a cable. Similarly, in the Utility pin of an image input terminal that performs the power supply, "8" indicates that the current supply is not possible, "9" indicates that 40 mA or more consumed by the cable is supplied, and "10" and "11" indicate that 490 mA or more is supplied. In the HPD pin of the image input terminal, "8", "9" and "10" indicate that the current supply is not possible, and "11" indicates that it is possible to supply 490 mA and it is possible to supply 980 mA or more in combination with the Utility pin.

Messages are defined as described above, the power reception device requests a predetermined voltage and current by <CDC_Power_Request> that is a request message to the power supply device, and the power supply device replies <CDC_Power_Status> that is a response message after starting the supply of the requested voltage and current. After receiving this reply, the power reception device starts to use power. In a case where the power supply becomes unnecessary, by transmitting power request message <CDC_Power_Request> with an argument for current unnecessity, it is noted to the power supply device that the power supply can be stopped. After stopping the power supply, the power supply device replies <CDC_Power_Status> that is a response message with an argument indicating no supply current.

Moreover, in a case where the power supply device wants to stop the power supply or change the supply current, it gives notice by transmitting a <CDC_Power_Notice> message to the power reception device. In a case where the power reception device having received this notice can accept it, it replies <CDC_Power_Request> as a power request message to the power supply device, with the same argument as the notice. In a case where the acceptation is not possible, it replies <CDC_Power_Request> as a power request message to the power supply device, with an argument indicating a necessary voltage and current. After receiving this reply message, the power supply device responds thereto and determines whether to supply power as requested. In a case where the acceptation is not possible, <CDC_Power_Notice> that is a notice message is output again. In a case where <CDC_Power_Request> that is a power request message indicating unaccepted power supply is repeated again by predetermined times (for example, two times) at predetermined time (for example, two seconds) intervals, the power supply may be stopped. By repeating it by predetermined times, it is possible to minimize an incorrect action.

Although the cable 31 may be formed with only a lead that does not consume power, there are a conversion cable and active cable that require power to convert electric signals or correct frequency characteristics, like an optical fiber and radio transmission. In the above-mentioned example, there is provided a mechanism in which it is possible to use maximum 5 mA from the DDC+5V pin of the source device 11 and maximum 40 mA at a voltage of 5 V from the Utility terminal of the sink device 21, without message exchange. However, when the sink device 21 always continues the current supply even by 40 mA, the set standby power may be increased. Therefore, in the present example, there is a feature that, when the image reception device supplies a current after confirming whether the source device 11 that always requires a power source is connected or whether a connection device that always requires the power source is connected, the power supply time is minimized and the standby power is reduced.

Figure 2:
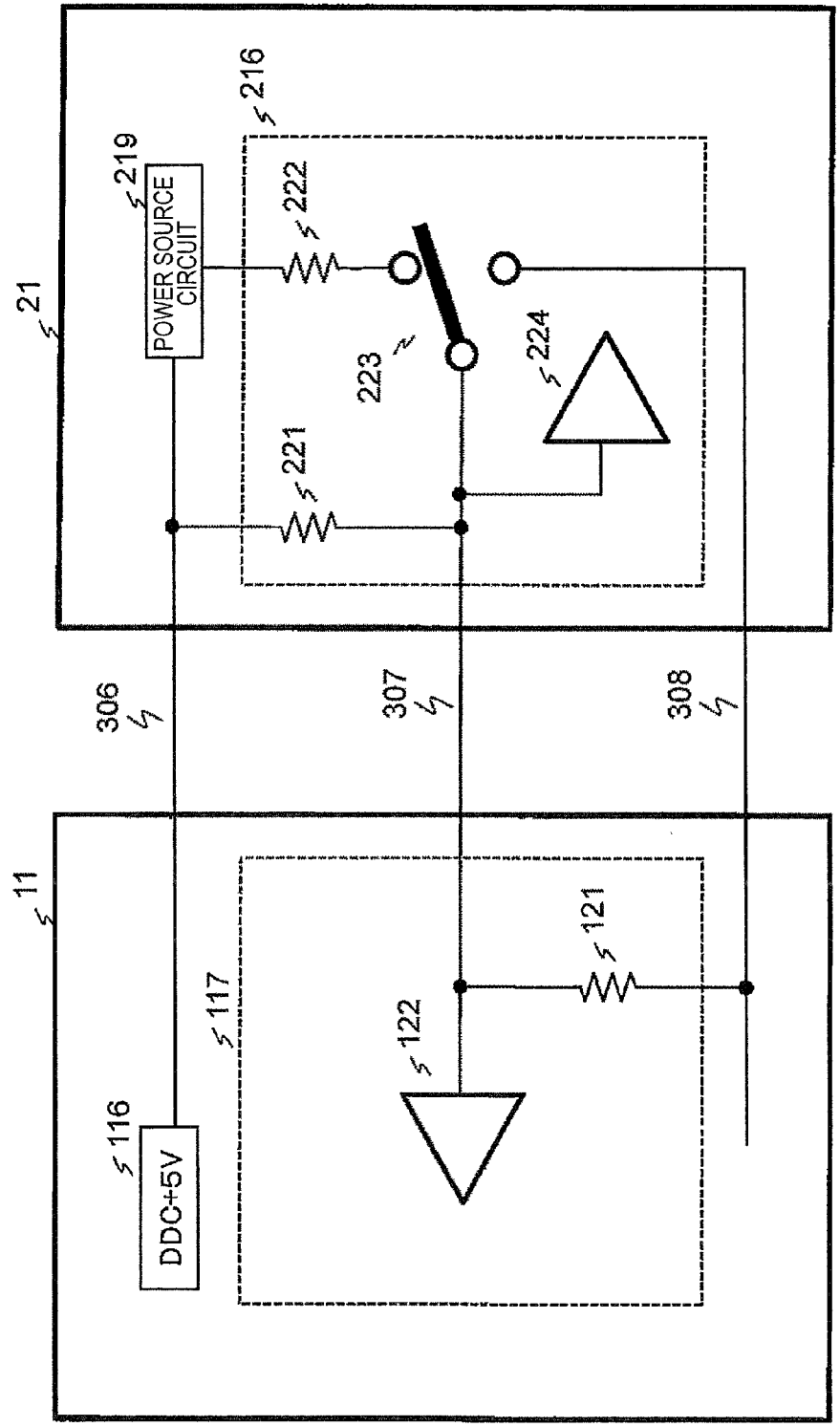
FIG. 2 is a circuit diagram illustrating one example of an HPD output unit and an HPD detection unit.

FIG. 2 is circuit diagram that describes one example of the internal circuits of the HPD detection unit 117 and the HPD output unit 216 in FIG. 1. The same numbers are assigned to the same blocks as FIG. 1. "308" denotes a GND line which is omitted to be described in FIG. 1, and is included in the cable 31.

The HPD detection unit 117 has a voltage detector 122 that detects the voltage level of the HPD line 307, and a resistance 121 that connects the HPD line 307 and the GND line 308. The resistance 121 is, for example, around 10 kΩ, has a feature of maintaining the input potential of the voltage detector 122 to 0 V in a case where the HPD line 307 is not connected, and is called "pull-down resistor". The voltage detector 122 treats an input potential of 0 V as "L" and determines that a cable including the HPD line 307 is disconnected.

In the HPD output unit 216 in a device in the related art, it is formed with only a resistor 221 that connects the DDC+5V line 306 and the HPD line. For example, about 1.2 kΩ is used as the resistance 221. When the cable is connected, 5 V is supplied from the DDC+5V supply unit 116 to the DDC+5V line 306 and transmitted to the HPD line 307 through the resistance 221. Therefore, the voltage of the HPD line becomes 4.46 V that is a voltage dividing 5 V applied to the DDC+5V line 306 and 0 V of the GND line 308 by the resistance 221 and the resistance 121. The voltage detector 122 detects this voltage as "H" and detects that the cable is connected.

In this device in the related art, when the source device 11 supplies 5 V to the DDC+5V line 306 and detects that the HPD line becomes "H", it is understood to be connected with the sink device 21. However, the sink device 21 was not able to determine whether to be connected if 5 V is not supplied from the source device 11 to the DDC+5V line 306. In the present example, to determine it, the power source circuit 219, a resistance 222, a switch 223 and a voltage detector 224 are additionally installed. In the following, a method of determining that the sink device 21 and the source device 11 are connected by a cable is described.

The switch 223 is opened at normal time and is not shortened. In a case where the source device 11 supplies 5 V to the sink device 21 through the DDC+5V line, it is notified to the source device 11 that the HPD line 307 is pulled up through the resistance 221 as described above and connected as the "H" level. However, in a period in which EDID cannot be read out such as during EDID rewriting by the sink device 21, the switch 23 shortens the HPD line 307 to GND, transmits the "L" level to the source device 11 and virtually creates a disconnection state.

In a case where it is determined that the sink device and the source device are connected, the switch 223 shortens the HPD line 307 and the resistance 222. The resistance 222 is a sufficiently high value as compared with the resistance 121, for example, 100 kΩ, and pulls up a voltage supplied from the power source circuit 219, for example, 3.3 V. An input of the voltage detector 224 becomes 3.3 V when the HPD line 307 is disconnected, and the voltage detector 224 detects "H". When the HPD line is connected, the potential of the HPD line becomes 0.3 V dividing 3.3 V by 100 kΩ of the resistance 222 and 10 kΩ of the resistance 121, and therefore, the voltage detector 224 detects "L". At this time, if an input of the power source circuit 219 with which the DDC+5V line 306 is connected is set to sufficiently higher impedance than the resistance 222, it is possible to reduce the influence on the above-mentioned divided voltage.

Thus, by detecting "L" at the time of connection with the HPD line and detecting "H" at the time of disconnection with the HPD line, the voltage detector 224 can determine whether a cable including HPD line 307 connects the source device 11 and the sink device 21 or the cable does not connect the source device 11 and the sink device 21.

For example, in HDMI, the HPD pin of the sink device 21 defines a range of 2.0 V to 5.3 V as "H" and defines a range of 0 V to 0.8 V as "L". Meanwhile, the HPD pin of the source device 11 defines a range of 2.4 V to 5.3 V as "H" and defines a range of 0 V to 0.4 V as "L". Even in the case of determining connection from the sink device 21 to the source device 11, to satisfy this definition is requested from the viewpoint of rear interchangeability.

When the sink device 21 pulls up the resistance 222 by the HPD line, in a case where the resistance value of the resistance 121 is substantially equal to the resistance 222, the voltage of the HPD line 307 reaches even a half voltage of the pull-up voltage. When 5 V is used as the pull-up voltage, it rises up to about 2.5 V, the HPD pin of the above-mentioned sink device 21 exceeds 2.0 V that is the lower limit of "H", and the specification is not satisfied. Therefore, it is desirable that the pull-up voltage is less than 5 V, and the pull-up voltage twice 2.0 V which is the lower limit voltage of "H" or less is more desirable. In the above-mentioned explanation, an explanation has been given with an assumption that the pull-up voltage supplied from the power source circuit 219 is common with 3.3 V used as the termination voltage of a data channel of HDMI. By sharing with the termination voltage, there is an advantage that it is possible to reduce the power supply voltage types prepared by the set.

Figure 3:
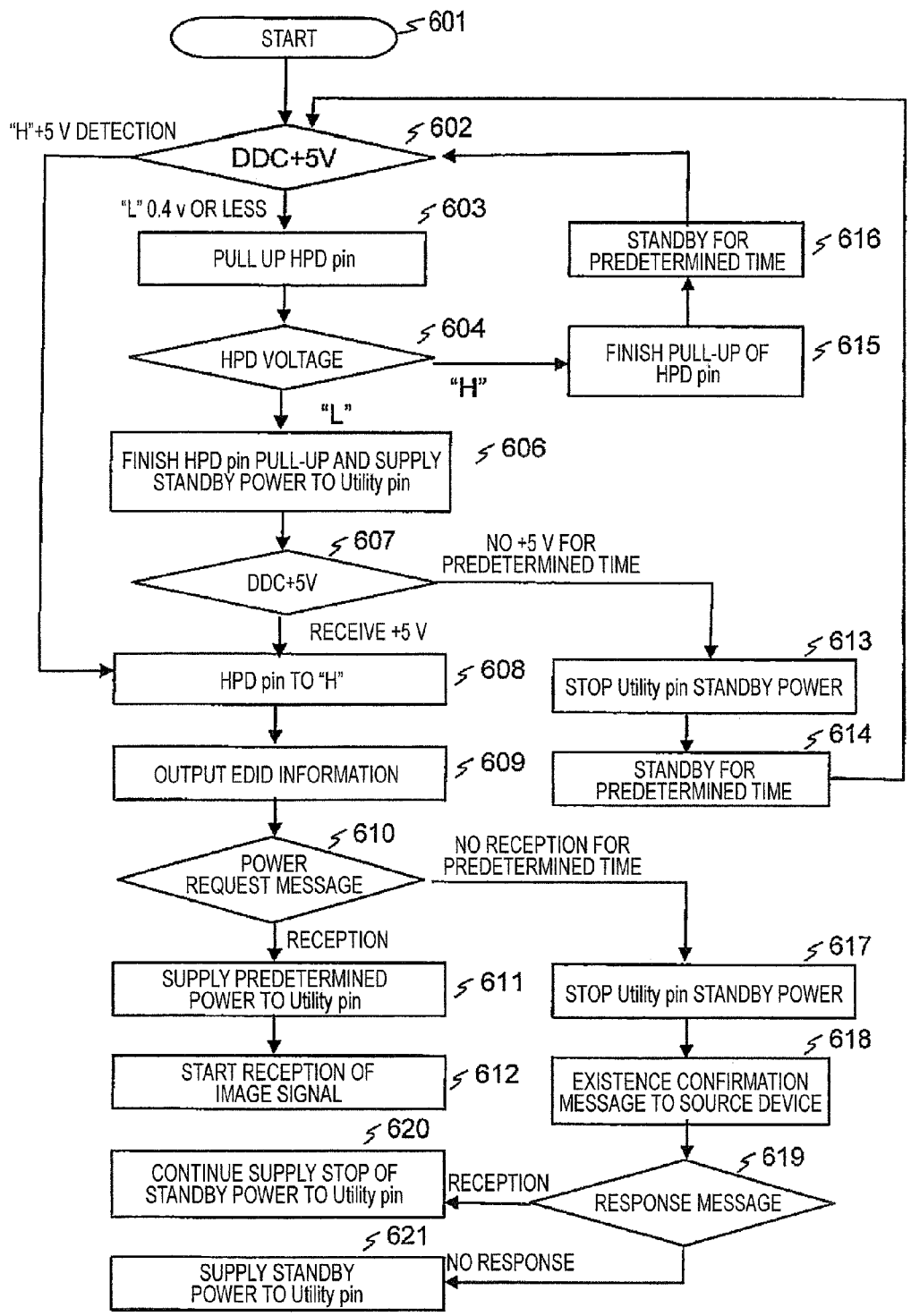
FIG. 3 is a flowchart illustrating one example of operation in a transmission system.

FIG. 3 is a flowchart illustrating one example of processing in the present example. In the following, the operation is described using FIG. 3.

It is assumed that the sink device 21 is in a standby state (601).

In the sink device 21, the power source circuit 219 determines a DDC+5V voltage of the DDC+5V line 306 (601). When +5V is detected, the HPD line 307 is made to "H" through the resistance 221 (608). It proceeds to 603 in the case of 0.4 V or less, and operates to confirm connection with the source device 11. Here, in a case where the DDC+5V line 306 is in a range of 0.4 V to 4.5 V, for example, 2.5 V may be used as a threshold (or threshold value), it may be treated as "H" when it is equal to or greater than it, and it may be treated as "L" when it is equal to or less than it. A voltage that becomes the threshold may be arbitrarily changed on the basis of the installation environment of the sink device.

As connection confirmation operation with the source device 11, in the sink device 21, the switch 223 selects the resistance 222, and the resistance 222 pulls up the HPD line to 3.3 V (603). Subsequently, the voltage of the HPD line 307 is determined by the voltage detector 224 (604). In the case of "L", it is determined that the HPD line 307 is connected with the source device 11, it proceeds to 606 in which the power supply starts.

When the determination result in the voltage detector 224 is "H", it is determined that the HPD line 307 is not connected with the source device 11, the HPD pin pull-up is terminated with an assumption that the switch 223 is in a disconnection state (615). It stands by for a predetermined time, for example, two seconds (616). Afterward, it proceeds to 602 in which the voltage of DDC+5V is determined.

Thus, the sink device 21 repeats the detection operation at predetermined time intervals until it detects that the source device 11 is connected with the cable. The cycle period may be changed according to the use state of each device. For example, in a time zone in which a use probability is high in the operation history of the sink device, it is convenient to shorten the predetermined time period in a case where a motion sensor detects a person or in a case where it is in a bright environment by an illumination sensor. Further, step 602 of DDC+5V detection may be always operated while the predetermined time period is set to be long, for example, ten seconds.

In a case where it is determined that the HPD line 307 is connected with the source device 11, the switch 223 is in a disconnection state, the HPD pin pull-up is terminated, and, for example, the supply of 40 mA is started as a standby current to the Utility pin (606). The supply current may be a value that does not exceed maximum 40 mA or 500 mA in the limitation circuit 215. If it is maximum 40 mA, since it is possible to reduce the current supply ability of the power supply unit 218, there is an advantage of decreasing power loss.

The power source circuit 219 determines whether a voltage of 5 V is applied to the DDC+5V pin (607). In a case where the 5 V application cannot be detected after waiting for a predetermined time, for example, ten seconds, the standby power supply to the Utility pin is stopped (613). Afterward, it stands by for a predetermined time, for example, ten seconds (614). Afterward, it returns to 602 of DDC+5V voltage detection.

When a voltage of 5 V is detected in 607, the HPD pin is pulled up to "H" through the resistance 221 (608). Subsequently, the EDID storage unit 213 of the sink device 21 outputs EDID information in response to a request of the EDID reading unit 113 of the source device 11 (609).

Afterward, it waits for a power request message from the source device 11 (610). When this message is received, a required prescribed power is supplied to the Utility pin (611). Subsequently, the image reception unit 212 of the sink device 21 receives an image signal output by the image transmission unit 112 of the source device 11 (612).

In 610, in a case where the power request message cannot be received for a predetermined time, for example, ten seconds, the supply of the Utility standby power is stopped (617). Subsequently, the CEC communication unit 214 of the sink device 21 sends a CEC message to confirm the existence of the source device 11 to the CEC communication unit 114 of the source device 11, for example, sends <Request Physical Address> and a polling message, and so on, to the source device (618). The CEC communication unit 214 waits for a response message for a predetermined time, for example, one second (619).

If the response message can be received, it is determined that the standby power supply is not necessary, and the standby power supply stop state is kept (620). In a case where there is no response message, it is determined that the standby power is necessary for CEC communication message exchange between the source device 11 and the sink device 21, and the standby power supply is restarted (621).

Here, in 618, in a case where the CEC message exchange is not performed between the source device 11 and the sink device 21, since it is not possible to transmit the existence confirmation message, it may be determined that the standby power supply is not necessary, and the standby power stop state may be continued.

Moreover, in a case where not only the CEC message exchange but also HEC (HDMI Ethernet channel) communication is established, the communication operation may be additionally confirmed.

Figure 4:
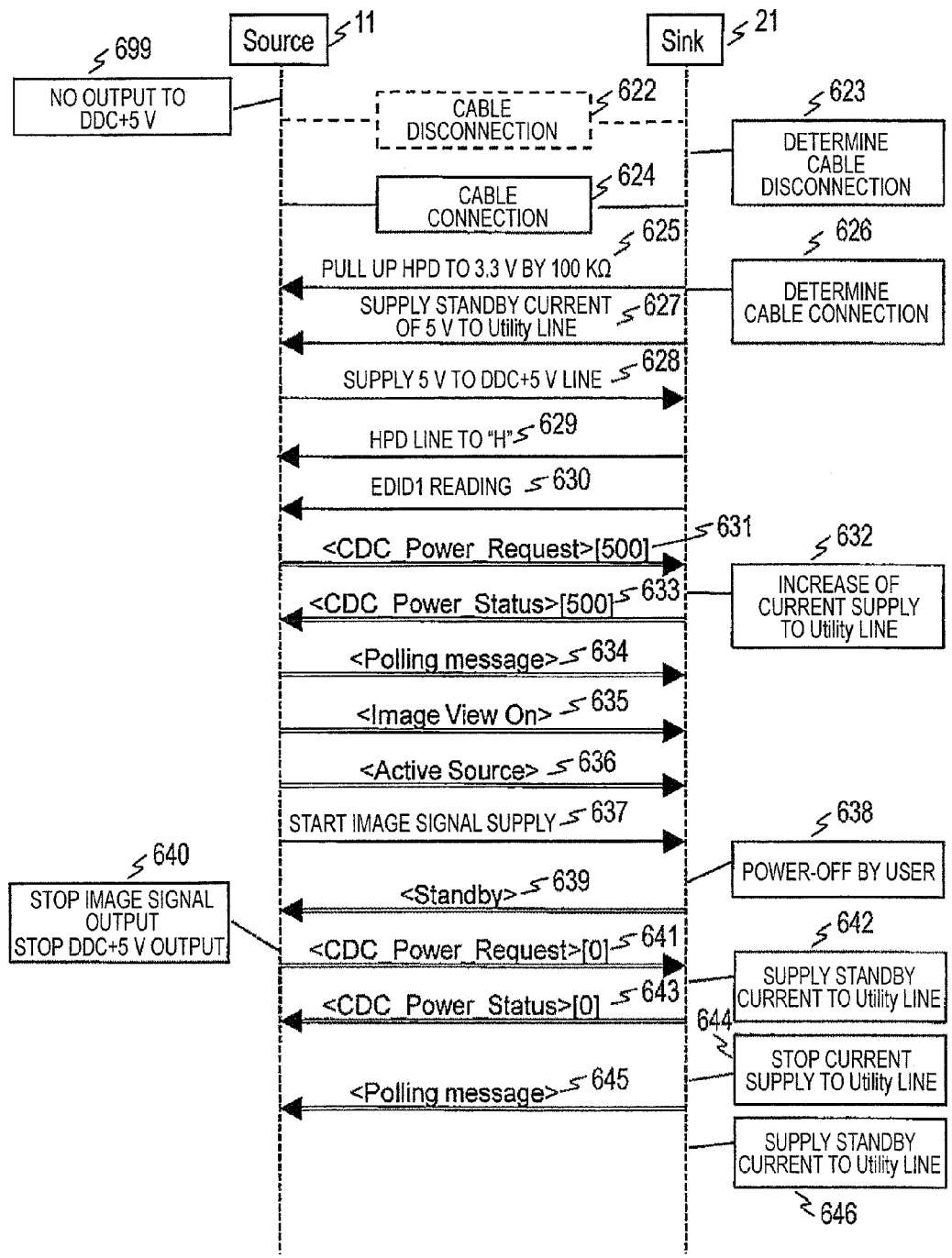
FIG. 4 is a diagram illustrating message transmission and reception of messages in a transmission system.

FIG. 4 is a diagram illustrating one example of message transfer and signal transfer in the present example. First, the source device 11 does not output 5 V to DDC+5V (699), and it starts from a disconnection state between the source device 11 and the sink device 21 (622). In this state, by the above-mentioned method, it is determined whether the sink device is connected by a cable with the source device, and disconnection is determined (623).

Next, the source device 11 and the sink device 21 are connected by a cable (624). The sink device pulls up the HPD line to 3.3 V by 100 kΩ (625). At this time, it is detected that the HPD line does not become "H", and it is determined that the source device 11 and the sink device 21 are connected by the cable (626). When it is determined, the pull-up of the HPD line is stopped, a predetermined standby current of 5 V, for example, maximum 40 mA to the Utility line is started to be supplied (627).

The source device 11 having received the supply of the standby power starts to supply 5 V to the DDC+5V line (628). The sink device 21 transmits 5 V received from the DDC+5V line to the HPD line through a resistance, and sets the HPD line to the "H" level (629). The source device 11 which detects that the HPD line becomes "H" reads out EDID which describes device information on the reception of an image of the sink device (630).

The source device 11 which reads out the EDID information and sets or confirms its own physical address transmits <CDC_Power_Rewuest> that is a request message to request the power supply to the sink device, to the sink device 21 (631). In FIG. 4, "631" writes only a current value as an argument and omits the writing of the others. The sink device 21 having received this message starts to supply the requested voltage and current to the Utility line (632). When the power supply is started, the sink device 21 transmits <CDC_Power_Status> that is a response message to the source device 11 (633).

The source device 11 broadcasts <Polling message> that is a message to examine the availability of a logical address, confirms that there is no ACK response, and acquires the logical address (634). Subsequently, it transmits <Image View On> that is a message to request power-on and image display to the sink device (635), further transmits <Active Source> that is a message showing the image signal transmission start (636) and starts to supply the image signal to the sink device 21 (637).

When the user operates the power-off of the sink device (636), the sink device 21 sends <Standby> that is a message to request a standby state shift to the source device 11 (637). The source device 11 having received this message stops the image signal output and the DDC+5V output (640), and transmits an argument to notify that the power supply is not necessary, for example, message <CDC_Power_Request> with "0" to the sink device 21(641). The sink device 21 having received this message reduces the current to the Utility line and supplies, for example, only mA as a standby current (642). Additionally, it transmits <CDC_ Power_Status> that is a response message with an argument to notify the current supply of only the standby current, to the source device 11 for notification.

Afterward, the sink device 21 confirms whether the cable connected with the source device requires the standby current. Therefore, after stopping the current supply to the Utility line (642), the sink device 21 transmits <Polling message> to the source device 11 (645). In a case where there is a response to <Polling message>, it is determined that the standby current is not necessary. When there is no response even if it waits for a predetermined time, for example, two seconds, it is determined that the standby current supply is necessary, and the standby current supply to the Utility line is reactivated (646).

As described above, the sink device can stop the power supply only in a case where it is not connected with the source device or in a case where it is possible to transmit and receive a CEC message without the standby power supply even if they are connected. Thus, it is possible to realize power saving.

EXAMPLE 2

In Example 1, after stopping the current supply to the Utility line, the sink device 21 detects whether there is a response to a CEC message, and determines whether a standby current is necessary or it is not necessary. Instead thereof, in the present example, a current limit circuit 215 monitors the current value, determines that the standby current is not necessary in a case where the current is not detected for a predetermined time, for example, 30 seconds, and stops the standby current.

In Example 1, a case is considered where, when the standby current is stopped, control parameters such as a physical address held in a CEC communication unit of the source device 11 are deleted and CEC communication is stopped. Since the current supply is continued while the current use is continued in this example, it is possible to continue the CEC communication without interruption. Moreover, for reliability improvement, only in a case where the current limit circuit 215 determines that there is no current, after stopping the current supply to the Utility line described in Example 1, whether there is a response to a CEC message may be detected to reconfirm that the standby current is not necessary.

In a case where the Utility line 305 of the cable 31 is a thin line with a high resistance, for example, 5Ω, when the power source circuit 119 of the source device 11 uses a current of 200 mA, a voltage drop of 1 V is caused in both ends of the Utility line 305. Moreover, when there is contact resistance of a connector portion of the source device or the sink device, the voltage drop further increases, and a problem of heat generation in a cable or connector portion is considered. The voltage detection unit 115 of the source device 11 detects and transmits a voltage received by the source device 11 to the control unit 118, and the control unit 118 controls the power source circuit 119 such that it does not become equal to or less than a predetermined voltage, for example, 4 V, and suppresses or blocks a reception current. By this means, it is possible to prevent an overcurrent that exceeds the rating of the cable.

The predetermined detection voltage detected by the voltage detection unit 115 is decided as follows. It is assumed that the argument of <CDC_Power_Status> that is a CDC message received by the source device is voltage Vt. When it is assumed that the output voltage setting tolerance of the power supply unit 218 is 5%, the voltage drop in the cable is similarly allowed by 5% and the detection accuracy of the voltage detection unit 115 is similarly set to 5%, the predetermined detection voltage becomes 0.85 Vt that is lower than Vt by 15%. Since the detection accuracy of the voltage detection 115 is assumed to be 5%, the lowest detection voltage is 0.8 Vt that is lower by 20% and the maximum voltage of the power supply unit 218 is 1.05 Vt, and therefore the potential difference between both ends of the Utility line 305 becomes 0.25 Vt(=1.05 Vt −0.8 Vt). When the resistance value of the Utility line 305 is assumed to be R, the current is expressed by 0.25 Vt/R and the power loss is expressed by (0.25 Vt)^2/R. In a case where power supply voltage Vt is 5 V(±0.25 V) and Utility line resistance R is 10Ω, the predetermined detection voltage is 4.25 V(±0.25 V), the maximum current in the Utility line 125 mA and the power loss is 156 mW. In a case where Utility line resistance R is 1Ω, the maximum current is 1.25 A and the power loss is 1.56 W.

The guaranteed value of a supply current in the setting is considered. Since the maximum detection voltage is 0.9 Vt and the minimum voltage of the power supply unit 218 is 0.95 Vt, the both-end potential difference of the Utility line 305 becomes 0.05 Vt (=0.95 Vt −0.9 Vt). The current is expressed by 0.05 Vt/R and the power loss is expressed by (0.05 Vt)^2/R.

In a case where power supply voltage Vt is 5 V(±0.25 V) and Utility line resistance R is 10Ω, the predetermined detection voltage is 4.25 V(±0.25 V), the guaranteed supply current value in the Utility line is 25 mA and the loss is 6 mW. In a case where the Utility line resistance R is 1Ω, the guaranteed supply current value is 0.25 A and the loss is 63 mW.

Thus, there is a problem that the maximum current flowed in the Utility line and the guaranteed supply current value are greatly different. To reduce this difference, there are two following improvement plans. The first improvement plan is a method that the voltage detection unit 115 detects a voltage at the timing at which the power source circuit unit 119 does not consume a current, and sets a voltage that is lower than the voltage by 5%, as a detection voltage. In this method, since it is possible to compensate for the voltage setting difference in the power supply unit 218 and the voltage detection difference in the voltage detection unit 115, the maximum potential difference between the both ends of the Utility line 305 is always 0.05 Vt. Therefore, the maximum current value and the guaranteed supply current value are equal to 0.05 Vt/R and the loss is (0.05 Vt)^2/R.

The second improvement plan is a method of installing a current detection unit in addition to the voltage detection unit 115 and measuring the current directly. Similar to the first method, it is possible to make the maximum current value and the guaranteed supply current value equal. Since a reception voltage may become extremely low only by the current detection unit, the voltage detection unit 115 is also necessary such that power is not received when it is equal to or less than a predetermined reception power.

In a case where the sink device 21 that receives power from the DDC+5V line 306 receives the supply of a current equal to or greater than 50 mA decided in the DDC standard, similar to a case where the source device 11 receives power from the Utility line 305, by installing a voltage detection unit, it is possible to avoid a problem such as heat generation due to an increase in power loss by the DDC+5V line 306 in a case where the resistance value of the DDC+5V line 306 is high.

The voltage detection unit 224 described in FIG. 2 may be used as a voltage detection unit of power supplied from the DDC+5V line 306. A voltage detected by the voltage detection unit 224 is the voltage of the HPD line 307, which is potential dividing a voltage applied to the DDC+5V line 306 by the resistance 221 and the resistance 121. Normally, the resistance value of the resistance 221 is about 1/10 of the resistance of the resistance 121, and it can be converted as about 90% of the voltage of the DDC+5V line. Moreover, a switch may be installed in an input unit of the voltage detection unit 224, and the HPD line 307 and the DDC+5V line 306 may be switched.

As described above, in a case where the current use is not detected even if the sink device and the source device are connected, it is possible to stop the power supply. Thus, it is possible to realize power saving. Further, by installing a voltage detection unit for reception on the power reception side, it is possible to solve a problem such as voltage drop and heat generation by a cable.

EXAMPLE 3

Figure 5:
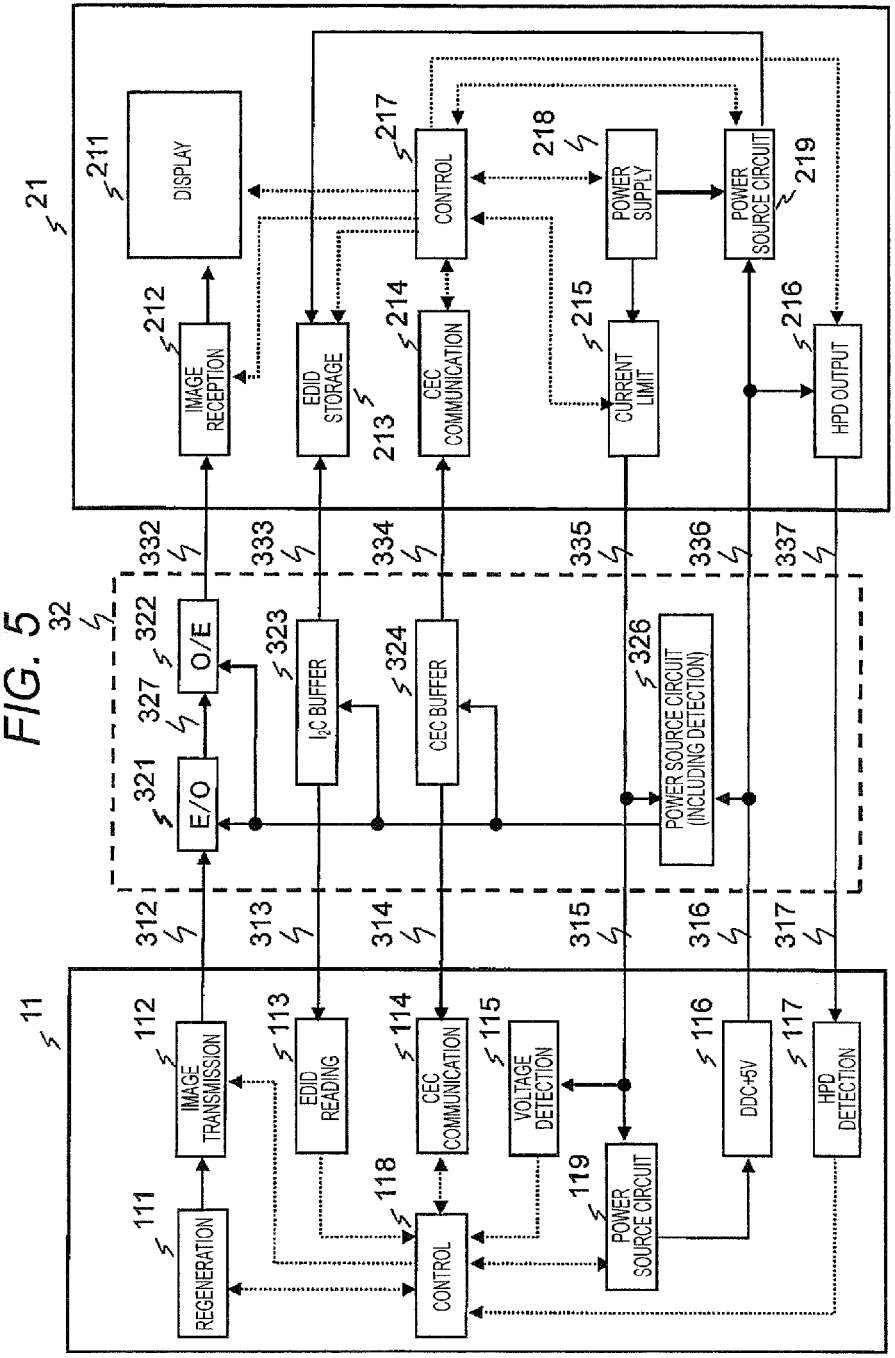
FIG. 5 is a block diagram illustrating one example of a cable.

FIG. 5 illustrates a block diagram in a case where the source device 11 and the sink device 21 are connected by an optical cable. A point different from FIG. 1 is that a cable that connects the source device 11 and the sink device 21 is changed from the electric line bundle 31 to an optical conversion cable 32 that converts electricity into light and performs optical fiber transmission.

"321" indicates an electricity-to-light conversion unit, "322" indicates a light-to-electricity conversion unit, "323" indicates an I$_2$C buffer, "324" indicates a CEC buffer and "326" indicates a power source circuit. Since these elements are operated by the power supply from the Utility line, when the standby power supply stops, it is not possible to exchange CEC messages. According to the procedure shown in Example 1, from a change in a message exchange function in the existence/nonexistence of standby power, the necessity/unnecessity of the standby power can be determined. Thus, since it is possible to realize minimum necessary standby power by detecting the necessity/unnecessity of the standby power, there is an advantage that it is possible to realize power saving of the sink device.

An optical cable 32 receives not only power from the sink device 21 through a Utility line 335 but also power received from the source device 11 through a DDC+5V line 316 together. The power reception from the source device is described below.

In the HDMI standard, while the source device 11 is obligated to supply a current of 5 V and 55 mA or more to the DDC+5V line, the sink device 21 is allowed to consume power of maximum 50 mA at the time of standby (or at the time of power-off) and power of maximum 10 mA at the time of power-on. Therefore, the optical cable 32 may consume 5 mA at the time of standby of the sink device 21 and 45 mA at the time of operation (at the time of power-on).

Since image signal transmission is not necessary at the time of standby in the sink device 21, the power supply to the electricity-to-light conversion unit 321 and the light-to-electricity conversion unit 322 is not necessary. While the power is supplied from the source device 11 to the DDC+5V line 316, by operating the I$_2$C buffer 323 and the CEC buffer 324, it is necessary to enable EDID reading and CEC communication message exchange. These I$_2$C buffer 323 and CEC buffer 324 can be operated below about 2 mA respectively and realized within 5 mA that can be used when the sink device 21 stands by.

In addition to 3.3 V and 10 mA per channel as a terminal power source to the image transmission unit 112 of the source device 11 at the time of operation, that is, in addition to 3.3 V and 40 mA in total of a clock channel and three data channels, the electricity-to-light conversion unit 321 uses 3 to 10 mA of an optical laser drive current and the control circuit power, that is, 3.3 V and 43 to 50 mA in total. If the switching regulator of a conversion efficiency of 90% from DDC+5V is used, it becomes 5 V and 32 to 37 mA. When the operation currents of the I$_2$C buffer 323 and the CEC buffer 324 are 2 mA respectively, it becomes 5 V and 36 to 41 mA, and therefore it can be realized within 45 mA which can be used at the time of operation of the sink device 21 described above. Here, the light-to-electricity conversion unit 322 may operate by remaining 4 mA or use the termination power source supplied from the image reception unit 212 of the sink device 212.

Here, it only has to determine whether the sink device 21 is in a standby state or it is in a power-on state, based on whether the image reception unit 212 outputs a termination power source of 3.3 V to the light-to-electricity conversion unit 322. That is, a voltage detection unit or a current detection unit is installed in the light-to-electricity conversion unit 322, and, when a voltage or a current is detected, the power-on state is determined. Afterward, a procedure to supply the terminal power source to the image transmission unit 112 of the source device 11 is assumed. Moreover, when the terminal current supply from an image reception unit 312 stops, the standby state is determined, and it is necessary to immediately stop the terminal current supply to the image transmission unit 112. However, in a case where power is supplied from the sink device 21 by the Utility line 335, the power source supply to the image transmission unit 112 may continue for a while and recovery operation may be advanced in a case where the terminal power source from the sink device is reactivated.

Thus, the optical cable 32 can be operated by either the power supply from the sink device 21 or the power supply from the source device 11, the power source circuit 326 may decide which power is used or whether both are used, based on the voltage detection the DDC+5V line 316 and the voltage detection in the Utility line 335. For example, a case is assumed where the source device is a battery-drive-type mobile device such as a mobile phone, power from the sink device 21 may be preferentially received.

In a case where power is not received from the sink device 21 or the source device 11, the optical cable 32 has to additionally prepare an AC adapter and always connect with an AC power source, and, even in a case where the optical cable is not connected or an image signal is not transmitted, the standby power of the AC adapter cannot be disregarded. According to the present embodiment, there is also an effect that it is possible to reduce the standby power of the optical cable 32.

REFERENCE SIGNS LIST

11 source device
21 sink device
31, 32 cable
111 regeneration unit
112 image transmission unit
113 EDID reading unit
114, 214 CEC communication unit
115 voltage detection unit
116 DDC+5V supply unit
117 HPD detection unit
118, 217 control unit
119, 219 power source circuit
211 display unit
212 image reception unit
213 EDID storage unit
215 current limit unit
216 HPD output unit
218 power supply unit
321 electricity-to-light conversion unit
322 light-to-electricity conversion unit
327 optical fiber
122, 224 voltage detection unit
121, 221, 222 resistance
223 switch
411 multiplexing unit

The invention claimed is:

1. A sink device which receives an image signal from a source device, comprising:
   a power supply unit which supplies power to the source device; and
   a detection unit which detects connection with the source device,
   wherein the power supply unit starts a power supply after the detection unit detects the connection with the source device, and
   wherein the power supply unit transmits a message to the source device after stopping the power supply to the source device, and, when there is a response to the transmitted message, the stop of the power supply from the power supply unit is continued.

2. The sink device according to claim 1,
   wherein the power supply unit transmits a message to the source device after stopping the power supply to the source device, and, when there is no response to the transmitted message, the power supply from the power supply unit is restarted.

3. The sink device according to claim 1, further comprising a power detection unit which detects power supplied from the power supply unit,
   wherein, when the power detection unit does not detect a supply current from the power supply unit for a predetermined time, the power supply from the power supply unit is stopped.

4. The sink device according to claim 1,
   wherein, in a case where the detection unit detects the power supply from the source device or a voltage of a hot plug detect line used for detection of the sink device by the source device is lower than a predetermined value, connection with the source device is determined.

5. A vower supply method in a sink device which receives an image signal from a source device, comprising:
   a step of detecting that the sink device is connected with the source device, and
   a step of supplying power from the sink device to the source device,
   wherein, after a connection between the sink device and the source device is detected, the supply of the power from the sink device to the source device starts, and wherein, after the supply of the power from the sink device to the source device is stopped, a message is transmitted from the sink device to the source device, and, when there is a response to the transmitted message from the source device to the sink device, the stop of the power supply from the sink device to the source device is continued.

6. The power supply method according to claim 5, wherein, after the supply of the power from the sink device to the source device is stopped, a message is transmitted from the sink device to the source device, and, when there is no response to the transmitted message from the source device to the sink device, the power supply from the sink device to the source device is restarted.

7. The power supply method according to claim 5, further comprising a step of detecting the power supplied from the sink device to the source device in the sink device, wherein, when the sink device does not detect the power supply from the sink device to the source device for a predetermined time, the power supply from the sink device to the source device is stopped.

8. The power supply method according to claim 5, wherein, in a case where the power supply from the source device is detected or a voltage of a hot plug detect line used for detection of the sink device by the source device is lower than a predetermined value, connection with the source device is determined.

\* \* \* \* \*